United States Patent
Beaumont et al.

(10) Patent No.: US 7,006,743 B2
(45) Date of Patent: Feb. 28, 2006

(54) CHROMATIC DISPERSION COMPENSATION OPTICAL FIBER

(75) Inventors: Florent Beaumont, Conflans Ste Honorine (FR); Pierre Sillard, Le Chesnay (FR); Ludovic Fleury, Bois D'Arcy (FR); Maxime Gorlier, Paris (FR); Louis-Anne de Montmorillon, Paris (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 286 days.

(21) Appl. No.: 10/673,454

(22) Filed: Sep. 30, 2003

(65) Prior Publication Data

US 2004/0136672 A1   Jul. 15, 2004

(30) Foreign Application Priority Data

Oct. 7, 2002   (FR) .................................. 02 12403

(51) Int. Cl.
   G02B 6/02     (2006.01)
   G02B 6/16     (2006.01)
   G02B 6/22     (2006.01)

(52) U.S. Cl. ....................... 385/127; 385/123; 385/124

(58) Field of Classification Search ......... 385/123–128
   See application file for complete search history.

(56) References Cited

U.S. PATENT DOCUMENTS

| 5,999,679 A | * | 12/1999 | Antos et al. ................. 385/127 |
| 6,349,163 B1 | | 2/2002 | Antos et al. ................. 385/123 |
| 6,751,389 B1 | * | 6/2004 | Tirloni ....................... 385/127 |

FOREIGN PATENT DOCUMENTS

| EP | 0 984 309 A1 | 3/2000 |
| EP | 1 111 414 A2 | 6/2001 |
| JP | 2002-82251 | 3/2002 |
| WO | WO 02/19576 A2 | 3/2002 |

\* cited by examiner

*Primary Examiner*—Akm Enayet Ullah
*Assistant Examiner*—Daniel Petkovsek
(74) *Attorney, Agent, or Firm*—Sughrue Mion, PLLC (57) ABSTRACT

The invention relates to a multiband chromatic dispersion compensation optical fiber comprising successively, from the center toward the periphery, a central slice whose maximum index is higher than the index of the cladding, a buried slice whose minimum index is lower than the index of the cladding, and an annular slice whose maximum index is higher than the index of the cladding and lower than the maximum index of the central slice, a cladding of constant index, and having, on the one hand, at the wavelength of 1550 nm, firstly a chromatic dispersion of less than −8 ps/nm.km, secondly a chromatic dispersion to dispersion slope ratio whose absolute value is greater than 750 nm, and thirdly a mode diameter greater than 5 μm, and on the other hand, at the wavelength of 1625 nm, bending losses for a radius of 10 mm that are less than 400 dB/m.

39 Claims, 7 Drawing Sheets

Figure 1

|  | $r_1$ (μm) | $r_2$ (μm) | $r_3$ (μm) | $\Delta n_1$ ($\times 10^3$) | $\Delta n_2$ ($\times 10^3$) | $\Delta n_3$ ($\times 10^3$) |
|---|---|---|---|---|---|---|
| 1a | 1.70 | 5.80 | 7.20 | 17.9 | -3.0 | 3.1 |
| 2a | 1.85 | 5.80 | 7.20 | 14.5 | -1.6 | 5.0 |
| 3a | 1.80 | 7.65 | 9.10 | 16.0 | -2.0 | 5.0 |
| 4a | 1.55 | 8.50 | 9.35 | 18.8 | -1.7 | 2.1 |
| 5a | 1.35 | 5.40 | 7.90 | 21.0 | -0.4 | 3.8 |
| 6a | 1.35 | 5.45 | 7.95 | 20.9 | -0.4 | 2.5 |
| 7a | 1.45 | 3.95 | 7.00 | 22.0 | -5.0 | 3.8 |
| 8a | 1.20 | 6.45 | 8.40 | 24.8 | -0.4 | 3.9 |
| 9a | 1.30 | 5.25 | 7.20 | 23.0 | -1.7 | 4.9 |
| 10a | 1.35 | 4.25 | 7.90 | 21.0 | -0.4 | 1.0 |

Figure 2

|  | C' [ps/(nm²,km)] @1550 nm | C/C' [nm] @1550 nm | $2W_{02}$ [μm] @1550 nm | $\lambda_{clh}$ (nm) |
|---|---|---|---|---|
| 1a | -0.0293 | 922 | 5.17 | 1254 |
| 2a | 0.0054 | -4609 | 6.14 | 1578 |
| 3a | -0.0109 | 1804 | 5.54 | 1762 |
| 4a | 0.0219 | -1254 | 5.26 | 866 |
| 5a | 0.0610 | -967 | 5.89 | 1741 |
| 6a | 0.0413 | -1237 | 5.72 | 1598 |
| 7a | -0.0259 | 3824 | 5.28 | 1608 |
| 8a | 0.0006 | -109907 | 5.26 | 1728 |
| 9a | -0.0150 | 5274 | 5.39 | 1645 |
| 10a | 0.0566 | -811 | 5.64 | 1388 |

Figure 3

|  | $S_{eff}$ [$\mu m^2$] @1460 nm | $S_{eff}$ [$\mu m^2$] @1550 nm | $S_{eff}$ [$\mu m^2$] @1625 nm | $S_{eff}$ [$\mu m^2$] @1675 nm |
|---|---|---|---|---|
| 1a | 17 | 20 | 23 | 26 |
| 2a | 24 | 29 | 34 | 39 |
| 3a | 20 | 23 | 26 | 29 |
| 4a | 18 | 21 | 24 | 26 |
| 5a | 20 | 27 | 36 | 44 |
| 6a | 19 | 25 | 32 | 38 |
| 7a | 16 | 23 | 33 | 44 |
| 8a | 16 | 21 | 27 | 33 |
| 9a | 17 | 23 | 31 | 40 |
| 10a | 19 | 24 | 30 | 35 |

Figure 4

|  | C [ps/(nm,km)] @1460 nm | C [ps/(nm,km)] @1550 nm | C [ps/(nm,km)] @1625 nm | C [ps/(nm,km)] @1675 nm |
|---|---|---|---|---|
| 1a | -25 | -27 | -30 | -32 |
| 2a | -25 | -25 | -24 | -22 |
| 3a | -20 | -20 | -21 | -23 |
| 4a | -30 | -27 | -26 | -26 |
| 5a | -61 | -59 | -52 | -43 |
| 6a | -53 | -51 | -47 | -42 |
| 7a | -88 | -99 | -92 | -78 |
| 8a | -65 | -66 | -65 | -61 |
| 9a | -74 | -79 | -76 | -68 |
| 10a | -50 | -46 | -41 | -36 |

Figure 5

|  | PC10mm [dB/m] @1550 nm | PC10mm [dB/m] @1625 nm | PC10mm [dB/m] @1675 nm | PC30mm [dB/m] @1550 nm | PC30mm [dB/m] @1625 nm | PC30mm [dB/m] @1675 nm |
|---|---|---|---|---|---|---|
| 1a | < 3 | < 5 | < 25 | < $10^{-9}$ | < $10^{-8}$ | < $10^{-5}$ |
| 2a | < 3 | < 10 | < 50 | < $10^{-9}$ | < $10^{-6}$ | < $10^{-4}$ |
| 3a | < 3 | < 5 | < 50 | < $10^{-9}$ | < $10^{-7}$ | < $10^{-4}$ |
| 4a | < 3 | < 5 | < 25 | < $10^{-9}$ | < $10^{-6}$ | < $10^{-4}$ |
| 5a | < 3 | < 10 | < 25 | < $10^{-7}$ | < $10^{-7}$ | < $10^{-5}$ |
| 6a | < 3 | < 5 | < 50 | < $10^{-9}$ | < $10^{-7}$ | < $10^{-4}$ |
| 7a | < 3 | < 40 | < 150 | < $10^{-9}$ | < $10^{-5}$ | < $10^{-3}$ |
| 8a | < 3 | < 5 | < 50 | < $10^{-9}$ | < $10^{-7}$ | < $10^{-5}$ |
| 9a | < 3 | < 20 | < 100 | < $10^{-9}$ | < $10^{-5}$ | < $10^{-3}$ |
| 10a | < 3 | < 5 | < 25 | < $10^{-9}$ | < $10^{-7}$ | < $10^{-5}$ |

| | $r_{1a}$ (μm) | $r_1$ (μm) | $r_{1b}$ (μm) | $r_2$ (μm) | $r_3$ (μm) | $\Delta n_1$ (×10³) | $\Delta n_2$ (×10³) | $\Delta n_3$ (×10³) |
|---|---|---|---|---|---|---|---|---|
| 1b | 1.40 | 1.85 | 1.90 | 8.50 | 9.15 | 17.9 | -1.0 | 6.0 |
| 2b | 1.35 | 1.85 | 1.90 | 7.15 | 9.20 | 16.9 | -1.0 | 1.7 |
| 3b | 1.40 | 1.85 | 1.90 | 6.95 | 7.90 | 17.5 | -1.3 | 6.0 |
| 4b | 1.35 | 1.50 | 1.50 | 5.85 | 8.00 | 20.4 | -1.2 | 1.0 |
| 5b | 1.20 | 1.40 | 1.45 | 5.60 | 6.90 | 22.2 | -0.6 | 7.0 |
| 6b | 1.20 | 1.30 | 1.35 | 6.50 | 7.90 | 23.4 | -0.7 | 6.5 |
| 7b | 1.15 | 1.65 | 1.70 | 5.95 | 7.10 | 21.0 | -0.9 | 8.0 |
| 8b | 1.20 | 1.30 | 1.35 | 5.90 | 7.05 | 24.0 | -0.9 | 8.0 |
| 9b | 1.15 | 1.65 | 1.70 | 6.20 | 7.35 | 21.2 | -0.7 | 7.3 |
| 10b | 1.20 | 1.60 | 1.70 | 3.70 | 7.75 | 22.3 | -4.9 | 2.2 |

Figure 8

| | C' [ps/(nm²·km)] @1550 nm | C/C' [nm] @1550 nm | $2W_{02}$ [μm] @1550 nm | $\lambda_{ch}$ (nm) |
|---|---|---|---|---|
| 1b | 0.0232 | -924 | 5.50 | 1565 |
| 2b | 0.0167 | -1455 | 5.75 | 1478 |
| 3b | -0.0029 | 9650 | 5.61 | 1631 |
| 4b | 0.0097 | -4109 | 5.30 | 1119 |
| 5b | 0.0805 | -807 | 5.80 | 1650 |
| 6b | -0.0200 | 3389 | 5.41 | 1735 |
| 7b | -0.0049 | 10086 | 5.46 | 1711 |
| 8b | 0.0054 | -13322 | 5.36 | 1683 |
| 9b | -0.0052 | 8872 | 5.40 | 1727 |
| 10b | -0.0863 | 972 | 5.12 | 1599 |

Figure 9

|  | $S_{eff}$ [μm²] @1460 nm | $S_{eff}$ [μm²] @1550 nm | $S_{eff}$ [μm²] @1625 nm | $S_{eff}$ [μm²] @1675 nm |
|---|---|---|---|---|
| 1b | 19 | 22 | 26 | 29 |
| 2b | 21 | 25 | 29 | 32 |
| 3b | 20 | 23 | 28 | 31 |
| 4b | 17 | 21 | 25 | 29 |
| 5b | 20 | 27 | 36 | 44 |
| 6b | 17 | 23 | 30 | 37 |
| 7b | 18 | 23 | 28 | 33 |
| 8b | 17 | 22 | 30 | 36 |
| 9b | 18 | 22 | 27 | 32 |
| 10b | 16 | 21 | 28 | 35 |

Figure 10

|  | C [ps/(nm,km)] @1460 nm | C [ps/(nm,km)] @1550 nm | C [ps/(nm,km)] @1625 nm | C [ps/(nm,km)] @1675 nm |
|---|---|---|---|---|
| 1b | -24 | -21 | -20 | -19 |
| 2b | -26 | -24 | -23 | -22 |
| 3b | -28 | -28 | -28 | -28 |
| 4b | -41 | -40 | -39 | -38 |
| 5b | -68 | -65 | -56 | -46 |
| 6b | -65 | -68 | -67 | -62 |
| 7b | -48 | -49 | -48 | -45 |
| 8b | -70 | -72 | -68 | -62 |
| 9b | -45 | -46 | -46 | -44 |
| 10b | -73 | -84 | -86 | -80 |

Figure 11

|  | PC10mm [dB/m] @1550 nm | PC10mm [dB/m] @1625 nm | PC10mm [dB/m] @1675 nm | PC30mm [dB/m] @1550 nm | PC30mm [dB/m] @1625 nm | PC30mm [dB/m] @1675 nm |
|---|---|---|---|---|---|---|
| 1b | < 3 | < 10 | < 50 | < $10^{-9}$ | < $10^{-7}$ | < $10^{-5}$ |
| 2b | < 3 | < 20 | < 100 | < $10^{-9}$ | < $10^{-5}$ | < $10^{-3}$ |
| 3b | < 3 | < 5 | < 25 | < $10^{-9}$ | < $10^{-8}$ | < $10^{-5}$ |
| 4b | < 3 | < 5 | < 25 | < $10^{-9}$ | < $10^{-7}$ | < $10^{-4}$ |
| 5b | < 3 | < 5 | < 25 | < $10^{-9}$ | < $10^{-8}$ | < $10^{-5}$ |
| 6b | < 3 | < 10 | < 50 | < $10^{-9}$ | < $10^{-7}$ | < $10^{-4}$ |
| 7b | < 3 | < 5 | < 10 | < $10^{-9}$ | < $10^{-9}$ | < $10^{-6}$ |
| 8b | < 3 | < 5 | < 25 | < $10^{-9}$ | < $10^{-8}$ | < $10^{-5}$ |
| 9b | < 3 | < 5 | < 10 | < $10^{-9}$ | < $10^{-9}$ | < $10^{-8}$ |
| 10b | < 3 | < 25 | < 125 | < $10^{-7}$ | < $10^{-5}$ | < $10^{-3}$ |

| | $r_1$ ($\mu$m) | $r_2$ ($\mu$m) | $r_3$ ($\mu$m) | $r_4$ ($\mu$m) | $\Delta n_1$ ($\times 10^3$) | $\Delta n_2$ ($\times 10^3$) | $\Delta n_3$ ($\times 10^3$) | $\Delta n_4$ ($\times 10^3$) |
|---|---|---|---|---|---|---|---|---|
| 1c | 2.65 | 6.00 | 9.75 | 12.00 | 10.8 | -3.7 | 5.0 | -6.0 |
| 2c | 1.60 | 3.55 | 4.10 | 7.00 | 19.8 | -6.0 | -0.1 | 3.7 |
| 3c | 1.80 | 4.10 | 6.90 | 7.85 | 17.9 | -1.4 | 2.9 | 0.8 |
| 4c | 1.85 | 5.00 | 7.90 | 8.35 | 15.1 | -1.8 | 3.0 | 5.0 |
| 5c | 1.75 | 4.80 | 5.80 | 8.30 | 17.0 | -1.6 | 0.5 | 2.0 |
| 6c | 1.55 | 4.15 | 7.50 | 9.60 | 21.0 | -6.0 | 4.7 | -2.1 |
| 7c | 2.05 | 4.30 | 8.90 | 10.20 | 14.4 | -5.0 | 3.5 | -4.2 |
| 8c | 1.60 | 3.70 | 4.15 | 7.05 | 19.2 | -3.8 | 2.9 | 3.8 |
| 9c | 1.70 | 4.05 | 8.05 | 9.60 | 18.1 | -6.0 | 4.0 | -3.5 |
| 10c | 1.70 | 4.50 | 10.00 | 11.25 | 17.0 | -2.3 | 2.8 | -4.0 |

Figure 14

| | C' [ps/(nm²,km)] @1550 nm | C/C' [nm] @1550 nm | $2W_{02}$ [$\mu$m] @1550 nm | $\lambda_{cfh}$ (nm) |
|---|---|---|---|---|
| 1c | -0.0065 | 1522 | 6.71 | 1760 |
| 2c | -0.0065 | 12758 | 5.46 | 1607 |
| 3c | 0.0217 | -1167 | 5.60 | 1645 |
| 4c | 0.0007 | -49802 | 6.19 | 1761 |
| 5c | -0.0032 | 8366 | 5.59 | 1611 |
| 6c | -0.0858 | 1157 | 5.20 | 1606 |
| 7c | -0.0003 | 132667 | 6.13 | 1680 |
| 8c | 0.0579 | -1022 | 5.71 | 1665 |
| 9c | -0.0060 | 12589 | 5.60 | 1619 |
| 10c | -0.0076 | 6607 | 5.94 | 1760 |

Figure 15

|  | $S_{eff}$ [μm²] @1460 nm | $S_{eff}$ [μm²] @1550 nm | $S_{eff}$ [μm²] @1625 nm | $S_{eff}$ [μm²] @1675 nm |
|---|---|---|---|---|
| 1c | 30 | 36 | 43 | 48 |
| 2c | 18 | 25 | 34 | 44 |
| 3c | 20 | 24 | 28 | 31 |
| 4c | 24 | 30 | 37 | 44 |
| 5c | 20 | 23 | 27 | 31 |
| 6c | 16 | 23 | 33 | 44 |
| 7c | 24 | 30 | 39 | 47 |
| 8c | 20 | 26 | 34 | 41 |
| 9c | 19 | 26 | 37 | 47 |
| 10c | 21 | 28 | 36 | 44 |

Figure 16

|  | C [ps/(nm.km)] @1460 nm | C [ps/(nm.km)] @1550 nm | C [ps/(nm.km)] @1625 nm | C [ps/(nm.km)] @1675 nm |
|---|---|---|---|---|
| 1c | -9 | -10 | -10 | -8 |
| 2c | -75 | -83 | -77 | -66 |
| 3c | -27 | -25 | -23 | -21 |
| 4c | -33 | -35 | -33 | -30 |
| 5c | -27 | -27 | -27 | -26 |
| 6c | -82 | -99 | -95 | -81 |
| 7c | -37 | -40 | -37 | -32 |
| 8c | -60 | -59 | -52 | -43 |
| 9c | -67 | -76 | -69 | -58 |
| 10c | -47 | -50 | -48 | -42 |

Figure 17

|  | PC10mm [dB/m] @1550 nm | PC10mm [dB/m] @1625 nm | PC10mm [dB/m] @1675 nm | PC30mm [dB/m] @1550 nm | PC30mm [dB/m] @1625 nm | PC30mm [dB/m] @1675 nm |
|---|---|---|---|---|---|---|
| 1c | < 3 | < 5 | < 10 | < $10^{-9}$ | < $10^{-8}$ | < $10^{-6}$ |
| 2c | < 3 | < 25 | < 100 | < $10^{-9}$ | < $10^{-5}$ | < $10^{-3}$ |
| 3c | < 3 | < 5 | < 10 | < $10^{-9}$ | < $10^{-9}$ | < $10^{-9}$ |
| 4c | < 3 | < 10 | < 50 | < $10^{-9}$ | < $10^{-7}$ | < $10^{-5}$ |
| 5c | < 3 | < 5 | < 10 | < $10^{-9}$ | < $10^{-9}$ | < $10^{-8}$ |
| 6c | < 3 | < 25 | < 150 | < $10^{-9}$ | < $10^{-5}$ | < $10^{-3}$ |
| 7c | < 3 | < 10 | < 50 | < $10^{-9}$ | < $10^{-7}$ | < $10^{-5}$ |
| 8c | < 3 | < 5 | < 10 | < $10^{-9}$ | < $10^{-9}$ | < $10^{-8}$ |
| 9c | < 3 | < 20 | < 100 | < $10^{-9}$ | < $10^{-4}$ | < $10^{-4}$ |
| 10c | < 3 | < 10 | < 150 | < $10^{-9}$ | < $10^{-7}$ | < $10^{-5}$ |

CHROMATIC DISPERSION COMPENSATION OPTICAL FIBER

The field of the invention is that of optical fibers for wavelength division multiplex transmission networks.

The increase in information bit rates on this type of network imposes compensation of chromatic dispersion and dispersion slope over an increasingly wide band of the spectrum. The S band corresponds to a band of the spectrum from approximately 1460 nm to 1530 nm. The C band corresponds to a band of the spectrum from approximately 1530 nm to 1565 nm. The L band corresponds to a band of the spectrum from approximately 1565 nm to 1625 nm. The U band corresponds to a band of the spectrum from approximately 1625 nm to 1675 nm. The most widely used band of the spectrum is the C band. There is an increasing tendency to want to use, in addition to the C band, the S, L and even U bands.

Associating dispersion shifted optical fibers for reducing nonlinear crossed effects, known as nonzero dispersion shifted fibers (NZ-DSF), with dispersion compensating fibers (DCF), is known in the art, and produces a transmission line with zero dispersion over a wide band of the spectrum.

A first prior art solution, as described in patent application WO 01/01179, for example, uses a chromatic dispersion compensated optical fiber having a low dispersion slope, but the chromatic dispersion to dispersion slope ratio for the optical fiber concerned is too low and does not effectively compensate NZ-DSF line fibers of low dispersion slope.

In a second prior art solution, described at the OECC/IOOC'01 conference, in a paper entitled "Dispersion flattened fiber with high negative dispersion", digital simulations describe a chromatic dispersion compensated optical fiber whose chromatic dispersion to dispersion slope ratio is very high, but the simulations, described orally at the same conference, do not confirm this and to the contrary yield usual values including a mode diameter of the order of 4 $\mu$m.

The invention proposes a chromatic dispersion compensation optical fiber which, having a chromatic dispersion to dispersion slope ratio that is sufficiently high, and advantageously having a low dispersion slope, can compensate an NZ-DSF line fiber of low dispersion slope. The chromatic dispersion compensation optical fiber according to the invention also has a relatively high mode diameter, and can therefore be used in optical transmission lines at very high bit rates, for example greater than 40 Gbits/s. The compromise obtained with the chromatic dispersion compensation optical fiber according to the invention enables effective compensation over a very wide range of the spectrum, possibly encompassing the S, C, L and U bands.

In accordance with the invention, there is provided an optical fiber for compensating chromatic dispersion over a plurality of bands of the spectrum, including at least the C band, for wavelength division multiplex transmission networks, including successively, from the center toward the periphery, a core having a varying index profile and then a cladding of constant index, the varying index profile of the core comprising successively, from the center toward the periphery, a central slice whose maximum index is higher than the index of the cladding, a buried slice whose minimum index is lower than the index of the cladding, and an annular slice whose maximum index is higher than the index of the cladding and lower than the maximum index of the central slice, the radii and the indices of each of the slices being determined so that the dispersion compensation optical fiber has, on the one hand, at the wavelength of 1550 nm, firstly a chromatic dispersion of less than −8 ps/nm.km, secondly a chromatic dispersion to dispersion slope ratio whose absolute value is greater than 750 nm, and thirdly a mode diameter greater than 5 $\mu$m, and on the other hand, at the wavelength of 1625 nm, bending losses for a radius of 10 mm that are less than 400 dB/m.

The radii and the indices of each of the slices are preferably determined so that the dispersion compensation optical fiber has, at the wavelength of 1550 nm, a chromatic dispersion to dispersion slope ratio whose absolute value is greater than 1500 nm.

The chromatic dispersion compensation optical fiber according to the invention preferably compensates the chromatic dispersion of a line optical fiber over the S, C, L and U bands.

The radii and the indices of each of the slices are preferably determined so that said dispersion compensation optical fiber has, at the wavelength of 1550 nm, a dispersion slope whose absolute value is less than 0.02 ps/nm$^2$.km.

The radii and the indices of each of the slices of the chromatic dispersion compensation optical fiber according to the invention are preferably determined so that said dispersion compensation optical fiber has an effective area greater than 20 $\mu$m$^2$ at the wavelength of 1550 nm.

The chromatic dispersion compensation optical fiber according to the invention is associated with a line optical fiber in a fiber optic transmission system. In one embodiment the fiber optic transmission system comprises the combination of a line optical fiber and a dispersion compensation optical fiber according to the invention incorporated in the line. In another embodiment the fiber optic transmission system comprises the combination of a line optical fiber and a dispersion compensation optical fiber according to the invention accommodated in a module.

In a first preferred embodiment of the invention, the chromatic dispersion compensation optical fiber according to the invention has a first type of varying core index profile with three slices. The first type of varying core index profile consists in succession, from the center toward the periphery, of a central slice having a maximum index higher than the index of the cladding, a buried slice having a minimum index lower than the index of the cladding, and an annular slice having a maximum index higher than the index of the cladding and lower than the maximum index of the central slice. The central slice is preferably trapezium-shaped or rectangular, but can also be triangular or alpha-shaped, for example. The other slices are preferably rectangular, but can also be triangular, trapezium-shaped, or alpha-shaped, for example.

A number of preferred ranges or relations are given next, in particular for the indices and the radii of the second type of core index profile, that improve the range of the spectrum over which the chromatic dispersion of the line optical fiber is compensated as effectively as possible by the chromatic dispersion compensation optical fiber according to the invention and other properties of the chromatic dispersion compensation optical fiber according to the invention.

In a first family of chromatic dispersion compensation optical fibers, the radii and the indices of each of the slices are determined so that the dispersion compensation optical fiber has, at the wavelength of 1550 nm, a chromatic dispersion from −40 ps/nm.km to −8 ps/nm.km. It is in this first family, rather than the second family described later, that it is particularly advantageous for the dispersion compensation optical fiber according to the invention to have a low dispersion slope.

The difference ($\Delta n_2$) between the minimum index of the buried slice and the index of the cladding is preferably from $-3.10^{-3}$ to 0 and the outside radius ($r_2$) of the buried slice is preferably from 5.8 μm to 8.5 μm.

The difference ($\Delta n_3$) between the maximum index of the annular slice and the index of the cladding is preferably from $1.10^{-3}$ to $6.10^{-3}$ and the outside radius ($r_3$) of the annular slice is preferably from 7.2 μm to 9.7 μm.

The value $$\left(S_1 = 2 \cdot \int_o^{r1} \Delta n(r) \cdot r \cdot dr\right)$$

of twice the integral between a zero radius and the radius ($r_1$) of the portion of the central slice having an index higher than the index of the cladding of the product of the radius by the index difference relative to the cladding is preferably from $39.10^{-3}$ to $65.10^{-3}$ μm².

The value $$\left(S_2 = 2 \cdot \int_{r1}^{r2} \Delta n(r) \cdot r \cdot dr\right)$$

of twice the integral between the radius ($r_1$) of the portion of the central slice having an index higher than the index of the cladding and the radius ($r_2$) of the portion of the buried slice having an index lower than the index of the cladding of the product of the radius and the index difference relative to the cladding is preferably from $-150.10^{-3}$ to $-10.10^{-3}$ μm².

The value $$\left(S_3 = 2 \cdot \int_{r2}^{r3} \Delta n(r) \cdot r \cdot dr\right)$$

of twice the integral between the radius ($r_2$) of the portion of the buried slice having an index lower than the index of the cladding and the radius ($r_3$) of the portion of the annular slice having an index higher than the index of the cladding of the product of the radius and the index difference relative to the cladding is preferably from $30.10^{-3}$ to $140.10^{-3}$ μm².

The value $$\left(S_{11} = 3 \cdot \int_0^{r1} \Delta n(r) \cdot r^2 \cdot dr\right)$$

of three times the integral between a zero radius and the radius ($r_1$) of the portion of the central slice having an index higher than the index of the cladding of the product of the square of the radius and the index difference relative to the index of the cladding is from $59.10^{-3}$ μm³ to $123.10^{-3}$ μm³.

If the central slice is rectangular, the difference ($\Delta n_1$) between the maximum index of the central slice and the index of the cladding is preferably from $14.10^{-3}$ to $20.10^{-3}$ and the radius ($r_1$) of the portion of the central slice having an index higher than the index of the cladding is preferably from 1.4 μm to 1.9 μm.

If the central slice is trapezium-shaped, the difference ($\Delta n_1$) between the maximum index of the central slice and the index of the cladding is preferably from $14.10^{-3}$ to $20.10^{-3}$ the radius ($r_1$) of the portion of the central slice having an index higher than the index of the cladding is preferably from 1.4 μm to 1.9 μm, and the radius ($r_{1a}$) of the portion of the central slice having the maximum index of the central slice is preferably from 1.3 μm to 1.9 μm.

In a second family of chromatic dispersion compensation optical fibers, the radii and the indices of each of the slices are determined so that the dispersion compensation optical fiber has, at the wavelength of 1550 nm, a chromatic dispersion of less than −40 ps/nm.km.

The difference ($\Delta n_2$) between the minimum index of the buried slice and the index of the cladding is preferably from $-5.10^{-3}$ to 0 and the outside radius ($r_2$) of the buried slice is preferably from 3.7 μm to 6.7 μm.

The difference ($\Delta n_3$) between the maximum index of the annular slice and the index of the cladding is preferably from $1.10^{-3}$ to $8.10^{-3}$ and the outside radius ($r_3$) of the annular slice is preferably from 6.1 μm to 8.4 μm.

The value $$\left(S_1 = 2 \cdot \int_o^{r1} \Delta n(r) \cdot r \cdot dr\right)$$

of twice the integral between a zero radius and the radius ($r_1$) of the portion of the central slice having an index higher than the index of the cladding of the product of the radius by the index difference relative to the cladding is preferably from $32.10^{-3}$ to $52.10^{-3}$ μm².

The value $$\left(S_2 = 2 \cdot \int_{r1}^{r2} \Delta n(r) \cdot r \cdot dr\right)$$

of twice the integral between the radius ($r_1$) of the portion of the central slice having an index higher than the index of the cladding and the radius ($r_2$) of the portion of the buried slice having an index lower than the index of the cladding of the product of the radius and the index difference relative to the cladding is preferably from $-70.10^{-3}$ to $-4.10^{-3}$ μm².

The value $$\left(S_3 = 2 \cdot \int_{r2}^{r3} \Delta n(r) \cdot r \cdot dr\right)$$

of twice the integral between the radius ($r_2$) of the portion of the buried slice having an index lower than the index of the cladding and the radius ($r_3$) of the portion of the annular slice having an index higher than the index of the cladding of the product of the radius and the index difference relative to the cladding is preferably from $7.10^{-3}$ to $150.10^{-3}$ μm².

The value $$\left(S_{11} = 3 \cdot \int_0^{r1} \Delta n(r) \cdot r^2 \cdot dr\right)$$

of three times the integral between a zero radius and the radius ($r_1$) of the portion of the central slice having an index higher than the index of the cladding of the product of the square of the radius and the index difference relative to the index of the cladding is preferably from $40.10^{-3}$ μm³ to $80.10^{-3}$ μm³.

If the central slice is rectangular, the difference ($\Delta n_1$) between the maximum index of the central slice and the index of the cladding is preferably from $17.10^{-3}$ to $25.10^{-3}$ and the radius ($r_1$) of the portion of the central slice having an index higher than the index of the cladding is preferably from 1.2 μm to 1.7 μm.

If the central slice is trapezium-shaped, the difference ($\Delta n_1$) between the maximum index of the central slice and the index of the cladding is preferably from $17.10^{-3}$ to $25.10^{-3}$ the radius ($r_1$) of the portion of the central slice having an index higher than the index of the cladding is preferably from 1.2 μm to 1.7 μm, and the radius ($r_{1a}$) of the portion of the central slice having the maximum index of the central slice is preferably from 1.1 μm to 1.7 μm.

For all chromatic dispersion compensation optical fibers corresponding to the first embodiment, the radii and the indices of each of the slices are determined so that the dispersion compensation optical fiber has a theoretical cut-off wavelength greater than 1600 nm.

In a second preferred embodiment of the invention, the chromatic dispersion compensation optical fiber according to the invention has a second type of varying core index profile with four slices. The second type of varying core index profile comprises, in succession, from the center toward the periphery, a central slice whose maximum index is higher than the index of the cladding, a first buried slice whose minimum index is lower than the index of the cladding, an annular slice whose maximum index is higher than the index of the cladding and lower than the maximum index of the central slice, and a second buried slice whose minimum index is lower than the index of the cladding. The central slice is preferably rectangular, but it can also be triangular, trapezium-shaped, or alpha-shaped. The other slices are preferably rectangular, but they can also be triangular, trapezium-shaped, or alpha-shaped, for example.

In a third embodiment, the chromatic dispersion compensation optical fiber according to the invention has a third type of varying core index profile that comprises, in succession, from the center toward the periphery, a central slice whose maximum index is higher than the index of the cladding, a buried slice whose minimum index is lower than the index of the cladding, a first annular slice whose maximum index is higher than the index of the cladding and lower than the maximum index of the central slice, and a second annular slice whose maximum index is higher than the index of the cladding and higher than the index of the first annular slice. The central slice is preferably rectangular, but it can also be triangular, trapezium-shaped, or alpha-shaped. The other slices are preferably rectangular, but they can also be triangular, trapezium-shaped, or alpha-shaped, for example.

In a fourth embodiment, the chromatic dispersion compensation optical fiber according to the invention has a fourth type of varying core index profile which successively comprises, from the center toward the periphery, a central slice whose maximum index is higher than the index of the cladding, a first buried slice whose minimum index is lower than the index of the cladding, a second buried slice whose minimum index is lower than the index of the cladding and higher than the index of the first buried slice, and an annular slice whose maximum index is higher than the index of the cladding and lower than the maximum index of the central slice. The central slice is preferably rectangular, but it can also be triangular, trapezium-shaped or alpha-shaped. The other slices are preferably rectangular, but they can also be triangular, trapezium-shaped or alpha-shaped, for example.

For all chromatic dispersion compensation optical fibers according to the invention conforming to the second, third, and fourth embodiments, the radii and the indices of each of the slices are preferably determined so that the dispersion compensation optical fiber has a theoretical cut-off wavelength higher than 1550 nm.

The invention will be better understood and other features and advantages of the invention will become apparent from the following description and the appended drawings, provided by way of example, in which.

Figure 1:
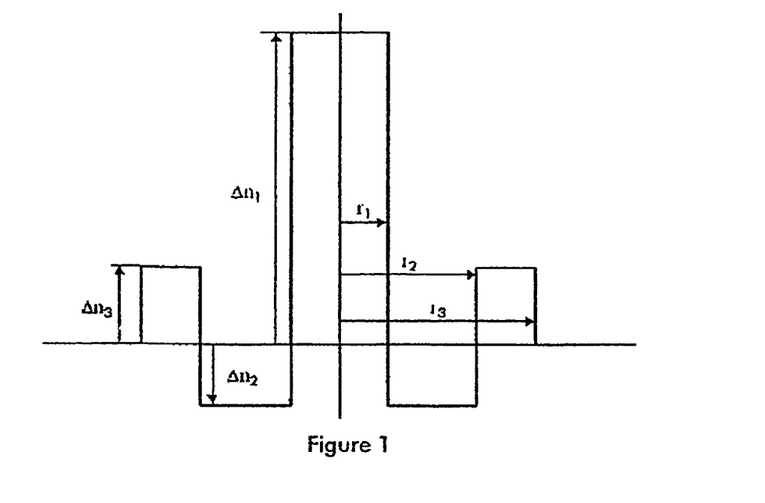
FIG. 1 shows diagrammatically one example of a first type of profile with three slices of a chromatic dispersion compensation optical fiber according to the invention.

FIG. 1 shows diagrammatically one example of a first type of profile with three slices of a chromatic dispersion compensation optical fiber according to the invention. The first slice, called the central slice, has a maximum index difference $\Delta n_1$ relative to the constant index of the cladding and an outside radius $r_1$. The maximum index difference $\Delta n_1$ is positive. The index is preferably constant and at a maximum between a zero radius and the radius $r_1$. The second slice, called the buried slice, has a maximum index difference $\Delta n_2$ relative to the constant index of the cladding and an outside radius $r_2$. The maximum index difference $\Delta n_2$ is negative. The index is preferably constant between the radius $r_1$ and the radius $r_2$. The third slice, called the annular slice, has a maximum index difference $\Delta n_3$ relative to the constant index of the cladding and an outside radius $r_3$. The maximum index difference $\Delta n_3$ is positive. The index is preferably constant between the radius $r_2$ and the radius $r_3$. Beyond the radius $r_3$ is the constant index cladding.

Figure 2:
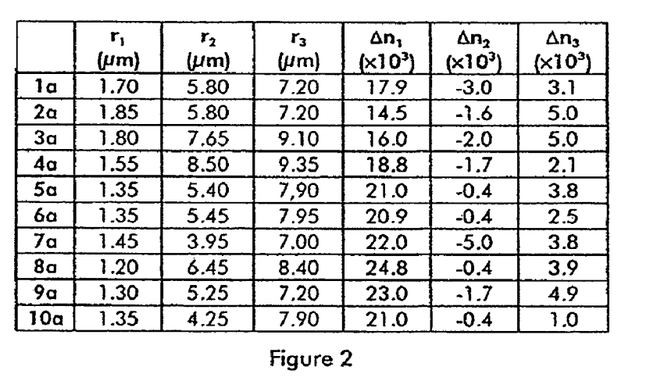
FIG. 2 is a table containing radii and index difference values for ten examples of profiles for the FIG. 1 example of a first type of chromatic dispersion compensation optical fiber according to the invention.

FIG. 2 is a table containing radii and index difference values for ten examples of profiles for this example of a first type of chromatic dispersion compensation optical fiber according to the invention. The left-hand column lists the examples from 1a to 10a. The next three columns represent the radii in µm of the varying index profile of the core. The last three columns give 1000 times the index differences (no units).

Figure 3:
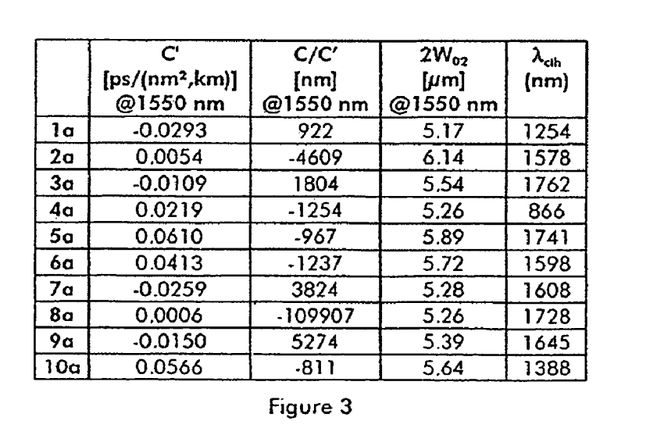
FIG. 3 is a table containing some properties of profiles of chromatic dispersion compensation optical fibers according to the invention as defined in FIG. 2.

FIG. 3 is a table containing some properties of profiles of chromatic dispersion compensation optical fibers according to the invention as defined in FIG. 2. The left-hand column lists the examples from 1a to 10a. For each example considered, the other columns represent properties of the optical fiber corresponding to the example concerned. The next column represents the dispersion slope C' expressed in ps/nm².km at a wavelength of 1550 nm. The next column represents the chromatic dispersion C to dispersion slope C' ratio expressed in nm at a wavelength of 1550 nm. The next column represents the mode diameter $2W_{02}$ expressed in µm at a wavelength of 1550 nm. The last column represents the theoretical cut-off wavelength $\lambda_{cth}$ expressed in nm.

Figure 4:
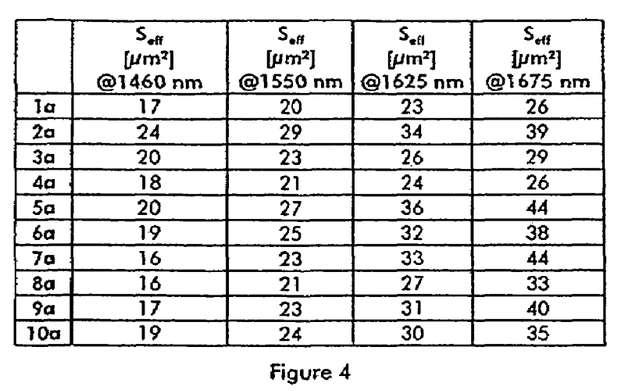
FIG. 4 is a table containing other properties of profiles of chromatic dispersion compensation optical fibers according to the invention as defined in FIG. 2.

FIG. 4 is a table containing other properties of profiles of chromatic dispersion compensation optical fibers according to the invention as defined in FIG. 2. The left-hand column lists the examples, as already explained hereinabove. For each example considered, the other columns represent properties of the optical fiber corresponding to the example concerned. The next four columns represent the effective area $S_{eff}$ expressed in µm² at respective wavelengths of 1460 nm, 1550 nm, 1625 nm and 1675 nm.

Figure 5:
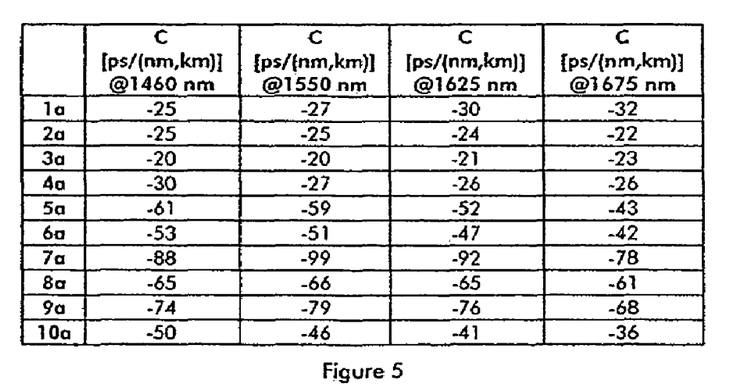
FIG. 5 is a table containing further properties of profiles of chromatic dispersion compensation optical fibers according to the invention as defined in FIG. 2.

FIG. 5 is a table containing further properties of profiles of chromatic dispersion compensation optical fibers according to the invention as defined in FIG. 2. The left-hand column lists the examples, as already explained hereinabove. For each example considered, the other columns represent properties of the optical fiber corresponding to the example concerned. The next four columns represent the chromatic dispersion C expressed in ps/nm.km at respective wavelengths of 1460 nm, 1550 nm, 1625 nm and 1675 nm.

Figure 6:
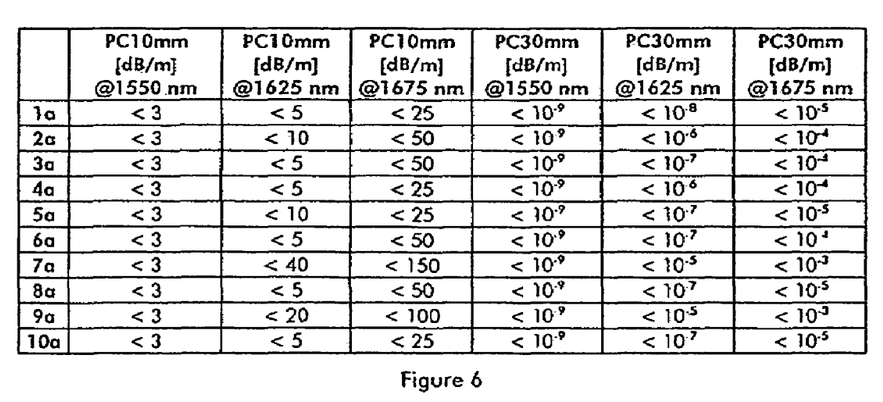
FIG. 6 is a table containing still further properties of profiles of chromatic dispersion compensation optical fibers according to the invention as defined in FIG. 2.

FIG. 6 is a table containing still further properties of profiles of chromatic dispersion compensation optical fibers according to the invention as defined in FIG. 2. The left-hand column lists the examples, as already explained hereinabove. For each example considered, the other columns represent properties of the optical fiber corresponding to the example concerned. The next three columns represent maximum bending loss thresholds expressed in dB/m for a radius of 10 mm at respective wavelengths of 1550 nm, 1625 nm and 1675 nm. For example, said bending losses are less than 3 dB/m in example 1a. The next three columns represent maximum bending loss thresholds expressed in dB/m for a radius of 30 mm at respective wavelengths 1550 nm, 1625 nm and 1675 nm.

Figure 7:
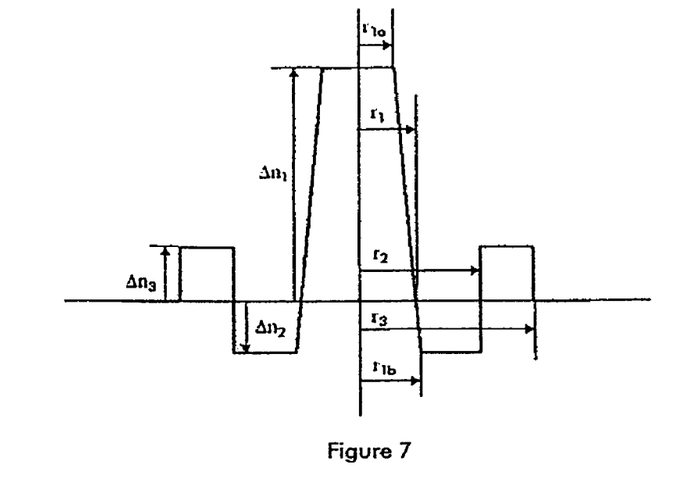
FIG. 7 shows diagrammatically another example of a first type of profile with three slices of a chromatic dispersion compensation optical fiber according to the invention.

FIG. 7 shows diagrammatically another example of a first type of profile with three slices of a chromatic dispersion compensation optical fiber according to the invention. The first slice, called the central slice, has a maximum index difference $\Delta n_1$ relative to the constant index of the cladding and an outside radius $r_{1b}$. The maximum index difference $\Delta n_1$ is positive. The index is preferably constant and at a maximum between a zero radius and the radius $r_{1a}$; it becomes equal to that of the cladding for a value $r_1$ of the radius and reaches that of the second slice for a value $r_{1b}$. The second slice, called the buried slice, has a maximum index difference $\Delta n_2$ relative to the constant index of the cladding and an outside radius $r_2$. The maximum index difference $\Delta n_2$ is negative. The index is preferably constant between the radius $r_{1b}$ and the radius $r_2$. The third slice, called the annular slice, has a maximum index difference $\Delta n_3$ relative to the constant index of the cladding and an outside radius $r_3$. The maximum index difference $\Delta n_3$ is positive. The index is preferably constant between the radius $r_2$ and the radius $r_3$. Beyond the radius $r_3$ is the constant index cladding.

Figure 8:
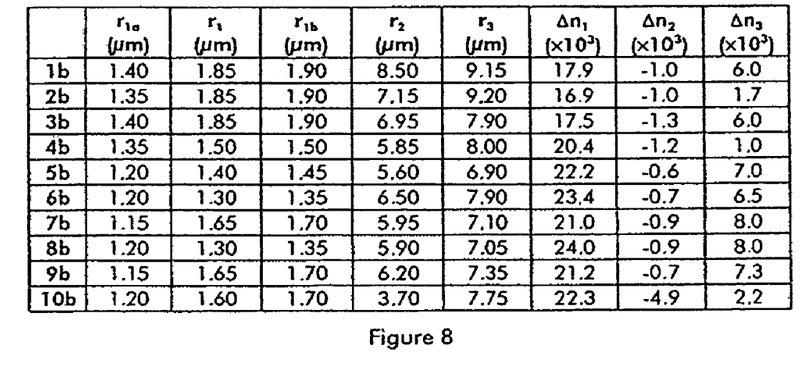
FIG. 8 is a table containing radii and index difference values for ten examples of profiles for the FIG. 7 example of a first type of chromatic dispersion compensation optical fiber according to the invention.

FIG. 8 is a table containing radii and index difference values for ten examples of profiles for this example of a first type of chromatic dispersion compensation optical fiber according to the invention. The left-hand column lists the examples from 1b to 10b. The next five columns express in µm the radii of the varying index profile of the core. The last three columns express 1000 times the index differences (no units).

Figure 9:
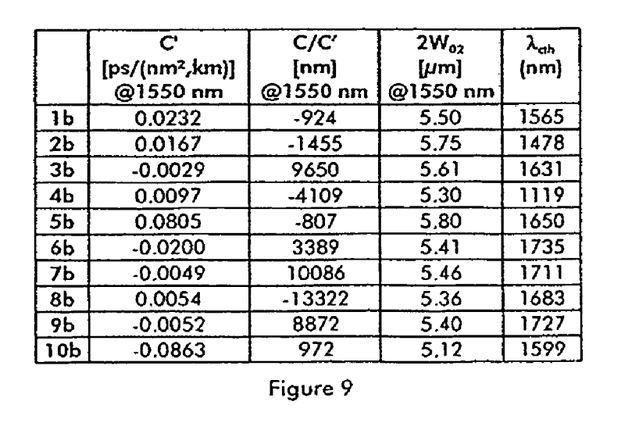
FIG. 9 is a table containing some properties of profiles of chromatic dispersion compensation optical fibers according to the invention as defined in FIG. 8.

FIG. 9 is a table containing some properties of profiles of chromatic dispersion compensation optical fibers according to the invention as defined in FIG. 8. Its description is analogous to that of FIG. 3.

Figure 10:
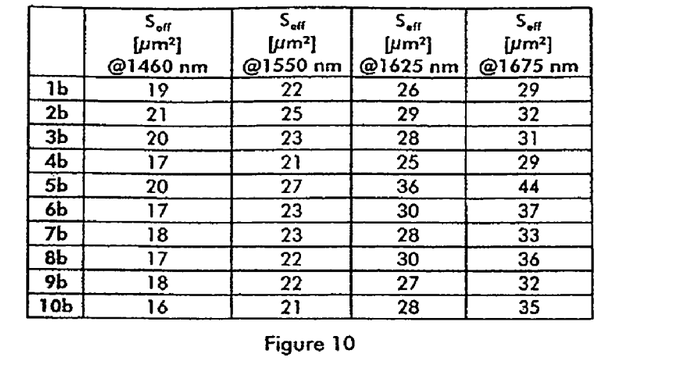
FIG. 10 is a table containing other properties of profiles of chromatic dispersion compensation optical fibers according to the invention as defined in FIG. 8.

FIG. 10 is a table containing other properties of profiles of chromatic dispersion compensation optical fibers according to the invention as defined in FIG. 8. Its description is analogous to that of FIG. 4.

Figure 11:
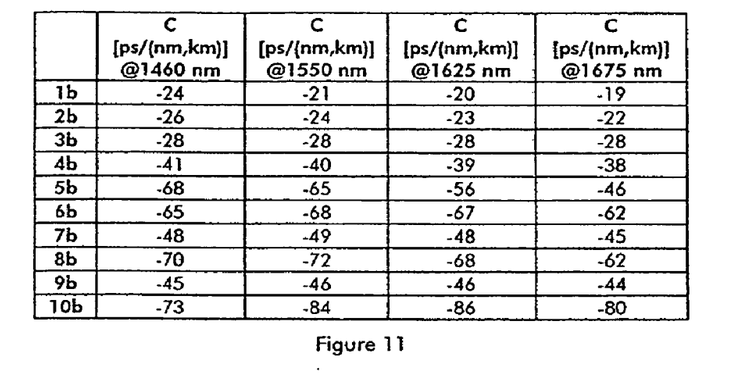
FIG. 11 is a table containing further properties of profiles of chromatic dispersion compensation optical fibers according to the invention as defined in FIG. 8.

FIG. 11 is a table containing further properties of profiles of chromatic dispersion compensation optical fibers according to the invention as defined in FIG. 8. Its description is analogous to that of FIG. 5.

Figure 12:
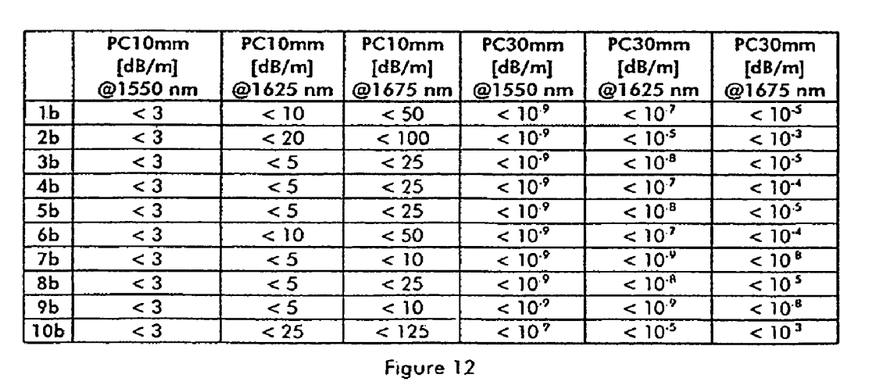
FIG. 12 is a table containing still further properties of profiles of chromatic dispersion compensation optical fibers according to the invention as defined in FIG. 8.

FIG. 12 is a table containing still further properties of profiles of chromatic dispersion compensation optical fibers according to the invention as defined in FIG. 8. Its description is analogous to that of FIG. 6.

Figure 13:
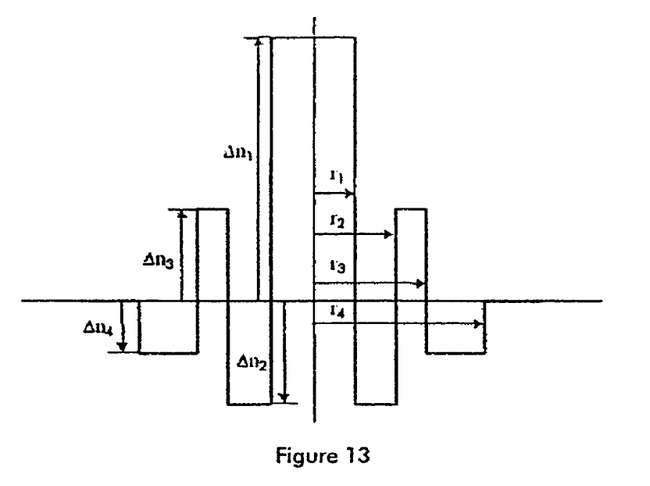
FIG. 13 shows diagrammatically second, third and fourth types of profile with four slices of a chromatic dispersion optical fiber according to the invention.

FIG. 13 shows diagrammatically second, third and fourth types of profile with four slices of a chromatic dispersion optical fiber according to the invention. The first slice, called the central slice, has a maximum index difference $\Delta n_1$ relative to the constant index of the cladding and an outside radius $r_1$. The maximum index difference $\Delta n_1$ is positive. The index is preferably constant between a zero radius and the radius $r_1$. The second slice, called the buried slice, has a maximum index difference $\Delta n_2$ relative to the constant index of the cladding and an outside radius $r_2$. The maximum index difference $\Delta n_2$ is negative. The index is preferably constant between the radius $r_1$ and the radius $r_2$. For the second and third types of profile, the third slice, called the annular slice, has a maximum index difference $\Delta n_3$ relative to the constant index of the cladding and outside radius $r_3$. The maximum index difference $\Delta n_3$ is positive. The index is preferably constant between the radius $r_2$ and the radius $r_3$. For the fourth type of profile, the third slice, called the buried slice, has a maximum index difference $\Delta n_3$ relative to the constant index of the cladding and an outside radius $r_3$. The maximum index difference $\Delta n_3$ is negative. The index is preferably constant between the radius $r_2$ and the radius $r_3$. For the second type of profile, the fourth slice, called the buried slice, has a maximum index difference $\Delta n_4$ relative to the constant index of the cladding and an outside radius $r_4$. The maximum index difference $\Delta n_4$ is negative. The index is preferably constant between the radius $r_3$ and the radius $r_4$. Beyond the radius $r_4$ is the constant index cladding. For the third and fourth types of profile, the fourth slice, called the annular slice, has a maximum index difference $\Delta n_4$ relative to the constant index of the cladding and an outside radius $r_4$. The maximum index difference $\Delta n_4$ is positive. The index is preferably constant between the radius $r_3$ and the radius $r_4$. Beyond the radius $r_4$ is the constant index cladding.

Figure 14:
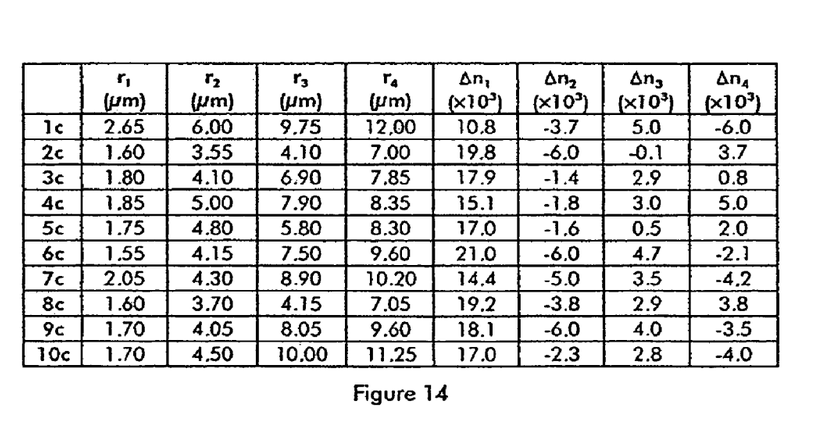
FIG. 14 is a table containing radii and index difference values for ten examples of second, third, and fourth types of profile of chromatic dispersion compensation optical fibers according to the invention.

FIG. 14 is a table containing radii and index difference values for ten examples of second, third, and fourth types of profile of chromatic dispersion compensation optical fibers according to the invention. The left-hand column lists the examples from 1c to 10c. The next four columns express in $\mu m$ the radii of the varying core index profile. The last four columns express 1000 times the index differences (no units).

Figure 15:
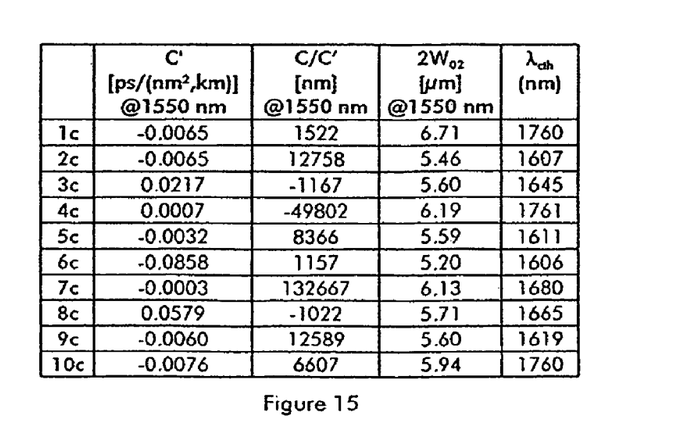
FIG. 15 is a table containing some properties of profiles of chromatic dispersion compensation optical fibers according to the invention as defined in FIG. 14.

FIG. 15 is a table containing some properties of profiles of chromatic dispersion compensation optical fibers according to the invention as defined in FIG. 14. Its description is analogous to that of FIG. 3.

Figure 16:
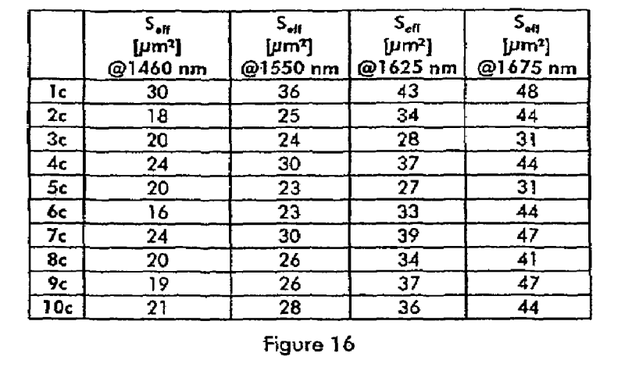
FIG. 16 is a table containing other properties of profiles of chromatic dispersion compensation optical fibers according to the invention as defined in FIG. 14.

FIG. 16 is a table containing other properties of profiles of chromatic dispersion compensation optical fibers according to the invention as defined in FIG. 14. Its description is analogous to that of FIG. 4.

Figure 17:
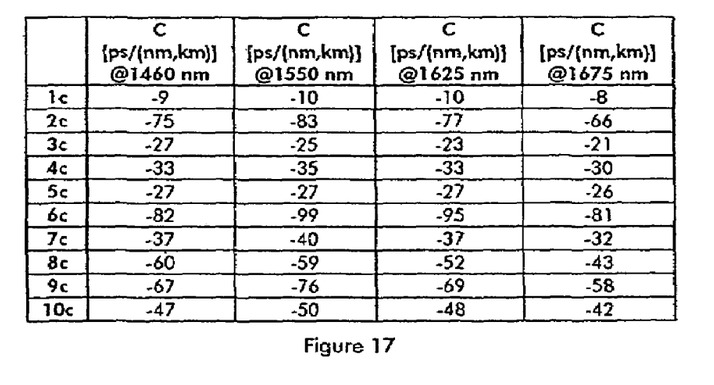
FIG. 17 is a table containing further properties of profiles of chromatic dispersion compensation optical fibers according to the invention as defined in FIG. 14.

FIG. 17 is a table containing further properties of profiles of chromatic dispersion compensation optical fibers according to the invention as defined in FIG. 14. Its description is analogous to that of FIG. 5.

Figure 18:
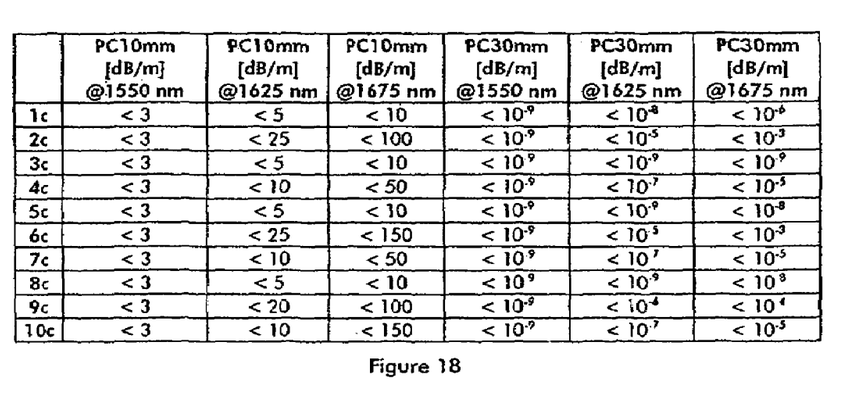
FIG. 18 is a table containing still further properties of profiles of chromatic dispersion compensation optical fibers according to the invention as defined in FIG. 14.

FIG. 18 is a table containing still further properties of profiles of chromatic dispersion compensation optical fibers according to the invention as defined in FIG. 14. Its description is analogous to that of FIG. 6.

Figure 19:
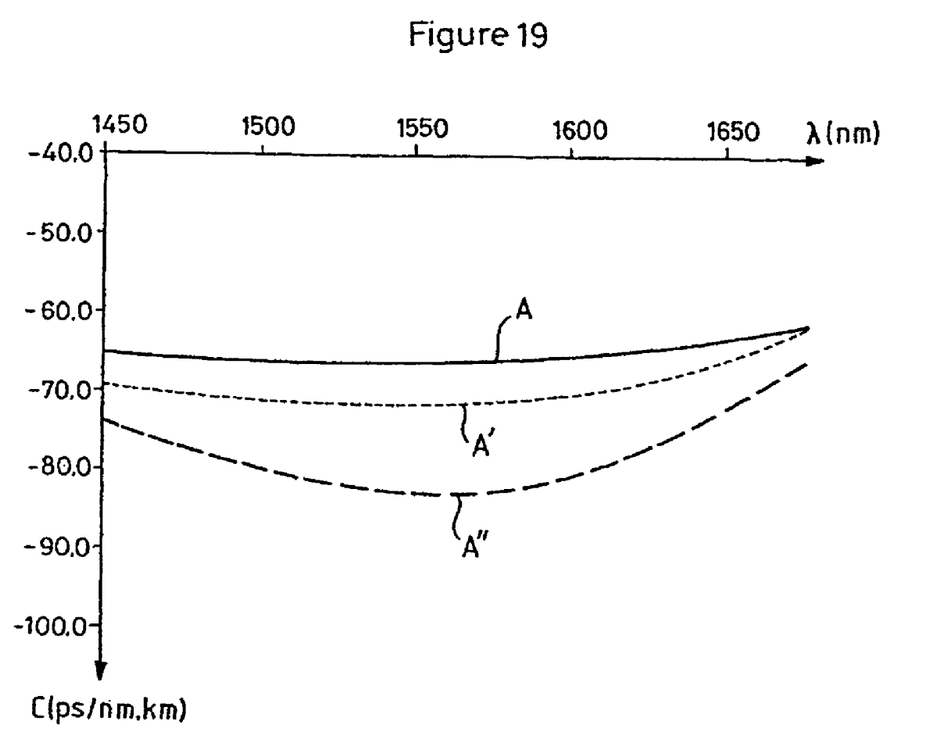
FIG. 19 shows the variation of the chromatic dispersion in the S, C, L and U bands, for the profile examples 8a, 8b, and 2c.

FIG. 19 shows the variation of the chromatic dispersion in the S, C, L and U bands, for the profile examples 8a, 8b, and 2c, respectively by way of the curves A, A', and A", in which the chromatic dispersion C expressed in ps/nm.km is plotted on the ordinate axis and the wavelength $\lambda$ expressed in nm is plotted on the abscissa axis.

In a first additional preferred embodiment of a chromatic dispersion compensation optical fiber according to the invention, the radii and the indices of each of the slices are also determined so that the dispersion compensation optical fiber also has, at the wavelength of 1550 nm, a chromatic dispersion from −200 ps/nm.km to −40 ps/nm.km and a difference $\Delta n_1$ between the maximum index of the central slice and the index of the cladding from $17.10^{-3}$ to $25.10^{-3}$. The moderate range of the values of the difference between the maximum index of the central slice and the index of the cladding yields a chromatic dispersion compensation optical fiber having not only improved attenuation and/or improved bending losses compared to optical fibers in which the difference between the maximum index of the central slice and the index of the cladding is around $30.10^{-3}$ or more but also a chromatic dispersion more negative than optical fibers in which the difference between the maximum index of the central slice and the index of the cladding is approximately $12.10^{-3}$ or less.

In a second additional preferred embodiment of a chromatic dispersion compensation optical fiber according to the invention, the radii and the indices of each of the slices are also determined so that the dispersion compensation optical fiber also has, at the wavelength of 1550 nm, a chromatic dispersion less than −40 ps/nm.km, a difference $\Delta n_1$ between the maximum index of the central slice and the index of the cladding from $17.10^{-3}$ to $25.10^{-3}$, and a value $$S_2 = 2 \cdot \int_{r_1}^{r_2} \Delta n(r) \cdot r \cdot dr,$$

of twice the integral between the radius ($r_1$) of the portion of the central slice having an index higher than the index of the cladding and the radius ($r_2$) of the portion of the buried slice having an index lower than the index of the cladding, of the product of the radius by the index difference relative to the cladding which is from $-70.10^{-3}$ to $-4.10^{-3}$ $\mu m^2$. The moderate range of the values of the difference between the maximum index of the central slice and the index of the cladding yields a chromatic dispersion compensation optical fiber having not only improved attenuation and/or improved bending losses compared to optical fibers in which the difference between the maximum index of the central slice and the index of the cladding is around $30.10^{-3}$ or more but also a chromatic dispersion more negative than optical fibers in which the difference between the maximum index of the central slice and the index of the cladding is approximately $12.10^{-3}$ or less.

The first and second additional preferred embodiments of the invention relate to optical fibers intended for use in modules.

In a third additional preferred embodiment of a chromatic dispersion compensation optical fiber according to the invention, the radii and the indices of each of the slices are also determined so that the dispersion compensation optical fiber also has, at the wavelength of 1550 nm, a chromatic dispersion from −40 ps/nm.km to −15 ps/nm.km, and a negative dispersion slope. A chromatic dispersion compensation optical fiber having a moderate absolute value of chromatic dispersion is advantageous compared to a chromatic dispersion compensation optical fiber whose chromatic dispersion has an absolute value that is low because a shorter length is then required to compensate a given line optical fiber; the chromatic dispersion compensation optical fiber having an attenuation that is generally higher than the attenuation of the line optical fiber, it is advantageous for the transmission line to contain as little chromatic dispersion compensation optical fiber as possible and as much line optical fiber as possible. A chromatic dispersion compensation optical fiber whose dispersion slope is negative is advantageous compared to a chromatic dispersion compensation optical fiber whose dispersion slope is positive because the positive dispersion slope of the great majority of line optical fibers can then be easily compensated.

According to a preferred option of the third additional preferred embodiment of the invention, in the chromatic dispersion compensation optical fiber according to the invention, the radii and the indices of each of the slices are also determined so that the dispersion compensation optical fiber also has, at the wavelength of 1550 nm, a difference $\Delta n_1$ between the maximum index of the central slice and the index of the cladding that is from $14.10^{-3}$ to $20.10^{-3}$. The moderate range of values of the difference between the maximum index of the central slice and the index of the cladding yields a chromatic dispersion compensation optical fiber having not only improved attenuation and/or improved bending losses compared to optical fibers in which the difference between the maximum index of the central slice and the index of the cladding is approximately $30.10^{-3}$ or more but also a chromatic dispersion more negative than optical fibers in which the difference between the maximum index of the central slice and the index of the cladding is approximately $12.10^{-3}$ or less.

The third additional preferred embodiment of the invention relates to optical fibers for use as line fibers.

The invention claimed is:

1. An optical fiber for compensating chromatic dispersion over a plurality of bands of the spectrum, including at least the C band, for wavelength division multiplex transmission networks, including successively, from the center toward the periphery, a core having a varying index profile and then a cladding of constant index,
   the varying index profile of the core comprising successively, from the center toward the periphery,
   a central slice whose maximum index is higher than the index of the cladding,
   a buried slice whose minimum index is lower than the index of the cladding, and
   an annular slice whose maximum index is higher than the index of the cladding and lower than the maximum index of the central slice,
   the radii and the indices of each of the slices being determined so that the dispersion compensation optical fiber has,
   on the one hand, at the wavelength of 1550 nm, firstly a chromatic dispersion of less than −8 ps/nm.km,
   secondly a chromatic dispersion to dispersion slope ratio whose absolute value is greater than 750 nm, and
   thirdly a mode diameter greater than 5 μm,
   and on the other hand, at the wavelength of 1625 nm, bending losses for a radius of 10 mm that are less than 400 dB/m.

2. A chromatic dispersion compensation optical fiber according to claim 1, characterized in that the radii and the indices of each of the slices are determined so that the dispersion compensation optical fiber has, at the wavelength of 1550 nm, a chromatic dispersion to dispersion slope ratio whose absolute value is greater than 1500 nm.

3. A chromatic dispersion compensation optical fiber according to claim 1, characterized in that the chromatic dispersion compensation optical fiber compensates the chromatic dispersion of a line optical fiber over the S, C, L and U bands.

4. A dispersion compensation optical fiber according to claim 1, characterized in that the varying index profile of the core successively comprises, from the center toward the periphery,
   a central slice whose maximum index is higher than the index of the cladding,
   a buried slice whose minimum index is lower than the index of the cladding, and
   an annular slice whose maximum index is higher than the index of the cladding and lower than the maximum index of the central slice.

5. A chromatic dispersion compensation optical fiber according to claim 4, characterized in that
   the radii and the indices of each of the slices are determined so that the dispersion compensation optical fiber has, at the wavelength of 1550 nm, a chromatic dispersion from −40 ps/nm.km to −8 ps/nm.km,
   the difference ($\Delta n_2$) between the minimum index of the buried slice and the index of the cladding is from $-3.10^{-3}$ to 0, and
   the outside radius ($r_2$) of the buried slice is from 5.8 μm to 8.5 μm.

6. A chromatic dispersion compensation optical fiber according to claim 5, characterized in that
   the difference ($\Delta n_3$) between the maximum index of the annular slice and the index of the cladding is from $1.10^{-3}$ to $6.10^{-3}$, and
   the outside radius ($r_3$) of the annular slice is from 7.2 μm to 9.7 μm.

7. A chromatic dispersion compensation optical fiber according to claim 6, characterized in that the value $$\left(S_3 = 2 \cdot \int_{r2}^{r3} \Delta n(r) \cdot r \cdot dr\right)$$

of twice the integral between the radius ($r_2$) of the portion of the buried slice having an index lower than the index of the cladding and the radius ($r_3$) of the portion of the annular slice having an index higher than the index of the cladding of the product of the radius and the index difference relative to the cladding is from $30.10^{-3}$ to $140.10^{-3}$ μm².

8. A dispersion compensation optical fiber according to claim 4, characterized in that the radii and the indices of each of the slices are determined so that the dispersion compensation optical fiber has a theoretical cut-off wavelength greater than 1600 nm.

9. A chromatic dispersion compensation optical fiber according to claim 1, characterized in that the radii and indices of each of the slices are determined so that the dispersion compensation optical fiber has, at the wavelength of 1550 nm, a chromatic dispersion from −40 ps/nm.km to −8 ps/nm.km.

10. A chromatic dispersion compensation optical fiber according to claim 9, characterized in that
    the radii and the indices of each of the slices are determined so that the dispersion compensation optical fiber has, at the wavelength of 1550 nm, a chromatic dispersion from −40 ps/nm.km to −8 ps/nm.km, and
    the value $$\left(S_1 = 2 \cdot \int_{o}^{r1} \Delta n(r) \cdot r \cdot dr\right)$$

of twice the integral between a zero radius and the radius ($r_1$) of the portion of the central slice having an index higher than the index of the cladding of the product of the radius by the index difference relative to the cladding is from $39.10^{-3}$ to $65.10^{-3}$ μm².

11. A chromatic dispersion compensation optical fiber according to claim 10, characterized in that the value $$\left(S_{11} = 3 \cdot \int_{0}^{r1} \Delta n(r) \cdot r^2 \cdot dr\right)$$

of three times the integral between a zero radius and the radius ($r_1$) of the portion of the central slice having an index higher than the index of the cladding of the product of the square of the radius and the index difference relative to the index of the cladding is from $59.10^{-3}$ µm³ to $123.10^{-3}$ µm³.

12. A chromatic dispersion compensation optical fiber according to claim 9, characterized in that
the radii and the indices of each of the slices are determined so that the dispersion compensation optical fiber has, at the wavelength of 1550 nm, a chromatic dispersion from −40 ps/nm.km to −8 ps/nm.km, and the value $$\left(S_2 = 2 \cdot \int_{r1}^{r2} \Delta n(r) \cdot r \cdot dr\right)$$

of twice the integral between the radius ($r_1$) of the portion of the central slice having an index higher than the index of the cladding and the radius ($r_2$) of the portion of the buried slice having an index lower than the index of the cladding of the product of the radius and the index difference relative to the cladding is from $-150.10^{-3}$ to $-10.10^{-3}$ µm².

13. A dispersion compensation optical fiber according to claim 9, characterized in that the central slice is rectangular.

14. A chromatic dispersion compensation optical fiber according to claim 13, characterized in that
the difference ($\Delta n_1$) between the maximum index of the central slice and the index of the cladding is from $14.10^{-3}$ to $20.10^{-3}$, and
the radius ($r_1$) of the portion of the central slice having an index higher than the index of the cladding is from 1.4 µm to 1.9 µm.

15. A dispersion compensation optical fiber according to claim 9, characterized in that the central slice is trapezium-shaped.

16. A chromatic dispersion compensation optical fiber according to claim 15, characterized in that
the difference ($\Delta n_1$) between the maximum index of the central slice and the index of the cladding is from $14.10^{-3}$ to $20.10^{-3}$,
the radius ($r_1$) of the portion of the central slice having an index higher than the index of the cladding is from 1.4 µm to 1.9 µm, and
the radius ($r_{1a}$) of the portion of the central slice having the maximum index of the central slice is from 1.31 µm to 1.88 µm.

17. A chromatic dispersion compensation optical fiber according to claim 1, characterized in that the radii and the indices of each of the slices are determined so that the dispersion compensation optical fiber has, at the wavelength of 1550 nm, a chromatic dispersion of less than −40 ps/nm.km.

18. A chromatic dispersion compensation optical fiber according to claim 17, characterized in that
the radii and the indices of each of the slices are determined so that the dispersion compensation optical fiber has, at the wavelength of 1550 nm, a chromatic dispersion from −40 ps/nm.km to −8 ps/nm.km,
the difference ($\Delta n_2$) between the minimum index of the buried slice and the index of the cladding is from $-5.5 \times 10^{-3}$ to 0, and
the outside radius ($r_2$) of the buried slice is from 3.7 µm to 6.7 µm.

19. A chromatic dispersion compensation optical fiber according to claim 18, characterized in that
the difference ($\Delta n_3$) between the maximum index of the annular slice and the index of the cladding is from $1.10^{-3}$ to $8.10^{-3}$, and
the outside radius ($r_3$) of the annular slice is from 6.1 µm to 8.4 µm.

20. A chromatic dispersion compensation optical fiber according to claim 19, characterized in that the value $$\left(S_3 = 2 \cdot \int_{r2}^{r3} \Delta n(r) \cdot r \cdot dr\right)$$

of twice the integral between the radius ($r_2$) of the portion of the buried slice having an index lower than the index of the cladding and the radius ($r_3$) of the portion of the annular slice having an index higher than the index of the cladding of the product of the radius and the index difference relative to the cladding is from $7.10^{-3}$ to $150.10^{-3}$ µm².

21. A chromatic dispersion compensation optical fiber according to claim 18, characterized in that the value $$\left(S_2 = 2 \cdot \int_{r1}^{r2} \Delta n(r) \cdot r \cdot dr\right)$$

of twice the integral between the radius ($r_1$) of the portion of the central slice having an index higher than the index of the cladding and the radius ($r_2$) of the portion of the buried slice having an index lower than the index of the cladding of the product of the radius and the index difference relative to the cladding is from $-70.10^{-3}$ to $-4.10^{-3}$ µm².

22. A chromatic dispersion compensation optical fiber according to claim 17, characterized in that
the radii and the indices of each of the slices are determined so that the dispersion compensation optical fiber has, at the wavelength of 1550 nm, a chromatic dispersion from −40 ps/nm.km to −8 ps/nm.km, and the value $$\left(S_1 = 2 \cdot \int_{0}^{r1} \Delta n(r) \cdot r \cdot dr\right)$$

of twice the integral between a zero radius and the radius ($r_1$) of the portion of the central slice having an index higher than the index of the cladding of the product of the radius by the index difference relative to the cladding is from $32.10^{-3}$ to $52.10^{-3}$ µm².

23. A chromatic dispersion compensation optical fiber according to claim 22, characterized in that the value $$\left(S_{11} = 3 \cdot \int_{0}^{r1} \Delta n(r) \cdot r^2 \cdot dr\right)$$

of three times the integral between a zero radius and the radius ($r_1$) of the portion of the central slice having an index higher than the index of the cladding of the product of the square of the radius and the index difference relative to the index of the cladding is from $40.10^{-3}$ µm³ to $80.10^{-3}$ µm³.

24. A dispersion compensation optical fiber according to claim 17, characterized in that the central slice is rectangular.

25. A chromatic dispersion compensation optical fiber according to claim 24, characterized in that
the difference ($\Delta n_1$) between the maximum index of the central slice and the index of the cladding is from $17.10^{-3}$ to $25.10^{-3}$, and
the radius ($r_1$) of the portion of the central slice having an index higher than the index of the cladding is from 1.2 µm to 1.7 µm.

26. A dispersion compensation optical fiber according to claim 17, characterized in that the central slice is trapezium-shaped.

27. A chromatic dispersion compensation optical fiber according to claim 26, characterized in that
the difference ($\Delta n_1$) between the maximum index of the central slice and the index of the cladding is from $17.10^{-3}$ to $25.10^{-3}$,
the radius ($r_1$) of the portion of the central slice having an index higher than the index of the cladding is from 1.2 µm to 1.7 µm, and
the radius ($r_{1a}$) of the portion of the central slice having the maximum index of the central slice is from 1.11 µm to 1.70 µm.

28. A dispersion compensation optical fiber according to claim 1, characterized in that the varying index profile of the core comprises successively, from the center towards the periphery,
a central slice whose maximum index is higher than the index of the cladding,
a buried slice whose minimum index is lower than the index of the cladding,
a first annular slice whose maximum index is higher than the index of the cladding and lower than the maximum index of the central slice, and
a second annular slice whose maximum index is higher than the index of the cladding and higher than the index of the first annular slice.

29. A dispersion compensation optical fiber according to claim 28, characterized in that the radii and the indices of each of the slices are determined so that the dispersion compensation optical fiber has a theoretical cut-off wavelength greater than 1550 nm.

30. A dispersion compensation optical fiber according to claim 1, characterized in that the varying index profile of the core comprises successively, from the center toward the periphery,
a central slice whose maximum index is higher than the index of the cladding,
a first buried slice whose minimum index is lower than the index of the cladding,
a second buried slice whose minimum index is lower than the index of the cladding and higher than the index of the first buried slice, and
an annular slice whose maximum index is higher than the index of the cladding and lower than the maximum index of the central slice.

31.: A dispersion compensation optical fiber according to claim 1, characterized in that the varying index profile of the core comprises successively, from the center toward the periphery,
a central slice whose maximum index is higher than the index of the cladding,
a first buried slice whose minimum index is lower than the index of the cladding,
an annular slice whose maximum index is higher than the index of the cladding and lower than the maximum index of the central slice, and
a second buried slice whose minimum index is lower than the index of the cladding.

32. A dispersion compensation optical fiber according to claim 1, characterized in that the radii and the indices of each of the slices are determined so that the dispersion compensation optical fiber has a dispersion slope whose absolute value is less than 0.02 ps/nm²km at the wavelength of 1550 nm.

33. A dispersion compensation optical fiber according to claim 1, characterized in that the radii and the indices of each of the slices are determined so that the dispersion compensation optical fiber has an effective area greater than 20 µm² at the wavelength of 1550 nm.

34. A chromatic dispersion compensation optical fiber according to claim 1, characterized in that the radii and the indices of each of the slices are determined so that the dispersion compensation optical fiber has, at the wavelength of 1550 nm,
a chromatic dispersion from −200 ps/nm.km to −40 ps/nm.km, and
a difference ($\Delta n_1$) between the maximum index of the central slice and the index of the cladding from $17.10^{-3}$ to $25.10^{-3}$.

35. A chromatic dispersion compensation optical fiber according to claim 1, characterized in that the radii and the indices of each of the slices are determined so that the dispersion compensation optical fiber has, at the wavelength of 1550 nm,
a chromatic dispersion less than −40 ps/nm.km,
a difference ($\Delta n_1$) between the maximum index of the central slice and the index of the cladding from $17.10^{-3}$ to $25.10^{-3}$, and
a value $$\left(S_2 = 2 \cdot \int_{r_1}^{r_2} \Delta n(r) \cdot r \cdot dr\right)$$

of twice the integral between the radius ($r_1$) of the portion of the central slice having an index higher than the index of the cladding and the radius ($r_2$) of the portion of the buried slice having an index lower than the index of the cladding of the product of the radius and the index difference relative to the cladding that is from $-70.10^{-3}$ to $-4.10^{-3}$ µm².

36. A chromatic dispersion compensation optical fiber according to claim 1, characterized in that the radii and the indices of each of the slices are determined such that the dispersion compensation optical fiber has, at the wavelength of 1550 nm,
a chromatic dispersion from −40 ps/nm.km to −15 ps/nm.km, and
a dispersion slope that is negative.

37. A chromatic dispersion compensation optical fiber according to claim 36, characterized in that the difference ($\Delta n_1$) between the maximum index of the central slice and the index of the cladding is from $14.10^{-3}$ to $20.10^{-3}$.

38. An optical fiber transmission system comprising the combination of a line optical fiber and a dispersion compensation optical fiber according to claim 1, the dispersion compensation optical fiber being incorporated in the line.

39. An optical fiber transmission system comprising the combination of a line optical fiber and a dispersion compensation optical fiber according to claim 1, the dispersion compensation optical fiber being accommodated in a module.

* * * * *